3,332,891
PROCESS FOR THE PREPARATION OF α-PERFLUORO-p-XYLYLENE POLYMERS
Sui-Wu Chow, Somerville, and Louis A. Pilato, Bound Brook, N.J., assignors to Union Carbide Corporation, a corporation of New York
No Drawing. Filed Sept. 23, 1963, Ser. No. 310,867
22 Claims. (Cl. 260—2)

This application is a continuation-in-part of our copending application Ser. No. 232,253 filed Oct. 22, 1962 now Patent No. 3,297,591.

This invention relates to the decomposition of p-xylene bis-sulfones. More particularly, this invention relates to the pyrolytic decomposition of p-xylene bis-sulfones and the polymers produced thereby.

The outstanding physical properties of the paraxylene polymer family have prompted extensive efforts to enable their convenient preparation. Although these polymers have excellent thermal and chemical stability, the presence of —CH$_2$— groups adjacent to the aromatic ring provide potentially vulnerable sites for atmospheric attack. In order to strengthen these weak positions, it has been found desirable to replace the active hydrogen atoms with a more stable substituent group such as fluorine.

Accordingly, it is an object of the present invention to provide para-xylyene polymers wherein the potentially vulnerable hydrogen atoms adjacent the aromatic ring are replaced by another, more stable substituent thereby increasing the overall stability of the polymers.

It is another object of the present invention to provide a process for the convenient preparation of para-xylylene polymers.

It is still another object to provide α,α,α',α'-tetra fluoro-p-xylylene polymers.

These and other objects of the present invention will become more apparent from the ensuing discussion and appended claims.

Now in accordance with the present invention thermoplastic linear para-xylylene polymers having the basic repeating unit

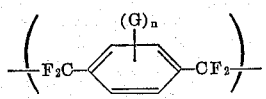

wherein G is an aromatic nuclear substituent group as hereinafter defined and n is a number from 0 to 4, inclusive, are produced by the method which comprises the steps of forming a p-xylene diradical having the basic structure

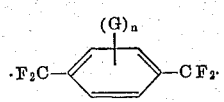

wherein G and n are as defined above, by the pyrolysis at temperatures between about 600° C. and 1000° C. of a p-xylene bis-sulfone having the general formula

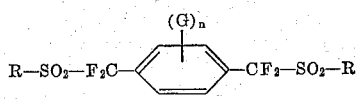

wherein G and n are as above and R is a lower hydrocarbon group, and cooling and condensing the thus formed diradicals to a temperature below about 40° C. to polymerize the diradicals instantaneously.

In this process a p-xylene diradical is produced by the pyrolytic cleavage of a p-xylene bis-sulfone represented by the general formula:

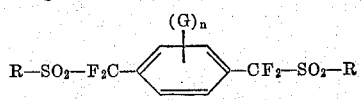

wherein G and n are as defined above. R can be any lower hydrocarbon group since the group tends to be inert in the process and is not otherwise critical. For instance, it can be a lower alkyl group such as methyl, ethyl, n-propyl, isopropyl, n-butyl, isobutyl, t-butyl, hexyl and the like, a lower aryl group such as phenyl, alkylated phenyl and the like, alicyclic groups such as cyclohexane and other similar groups. Preferably, the lower hydrocarbon groups contemplated in the present invention are those containing up to about six carbon atoms in order to facilitate the removal of the by-products produced in the pyrolysis.

Fluorinated-p-xylene bis-sulfones can be conveniently prepared by reacting an alkyl or aryl mercaptan, in the presence of a base such as the alkali metal hydroxides and alkoxides such as sodium hydroxide, potassium hydroxide, lithium hydroxide, potassium butoxide, sodium methoxide, or the like, with a compound having the general formula

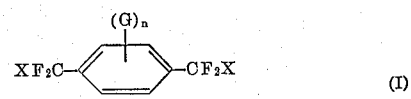

wherein G and n are as defined hereinabove and X is a halogen having a lower bond strength than fluorine to form the corresponding dithioether.

Compounds having the general Formula I can be prepared from known α,α,α',α'-tetrafluoro-p-xylenes by halogenating said tetrafluoro-p-xylene with a halogen having a lower bond strength than the fluorine already present in alpha position. For example, when α,α,α',α'-tetrafluoro-p-xylene is employed, halogens such as chlorine, bromine, or iodine could be employed in the X position since they have lower bond strengths than fluorine.

This halogenation reaction has been found to proceed well when the mixture of p-xylene precursor, halogenating agent such as gaseous chlorine, N-bromosuccinimide, and the like, and a suitable inert organic solvent is maintained at the reflux temperature of the solvent; however, other halogenating techniques can also be employed. The dithioether can then be oxidized to the corresponding bis-sulfone by oxidation with an oxidizing agent such as hydrogen peroxide, peracetic acid, or the like.

The pyrolytic cleaving of the bis-sulfone results in the formation of a reactive diradical having the basic structure

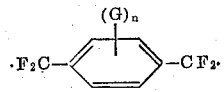

wherein G and n are as defined above, as well as the formation of gaseous sulfur dioxide and other gaseous materials such as saturated and/or unsaturated hydrocarbons produced by coupling of the R radicals formed in the cleaving process.

Inasmuch as the coupling of these reactive diradicals does not involve the aromatic ring, unsubstituted and/or nuclear substituted poly(α-perfluoro-p-xylylenes) can be prepared provided the aromatic nuclear substituent groups function essentially as inert groups. Thus, the substituent group G as employed herein can be organic or inorganic groups or both which can normally be substituted on aromatic nuclei. As an illustration of such substituent groups are aryl, carbalkoxy, lower normal alkyls preferably those having from about 1 to 3 carbon atoms such as methyl, ethyl and n-propyl, and like radicals as well as inorganic radicals such as the halogens such as fluorine, chlorine, bromine and other similar groups which are normally substitutable on aromatic nuclei. Otherwise the positions on the aromatic ring are filled by hydrogen atoms.

Upon cooling, the reactive diradicals polymerize instantaneously at the condensation temperature of the diradical. Thus by cooling the vaporous diradicals down to any temperature below the condensation temperature of the particular diradicals specie involved, the corresponding p-xylylene polymer instantaneously forms. It has been observed that for each diradical species, there is a definite ceiling condensation temperature above which the diradical will not condense and polymerize. All observed ceilings have been below 200° C. but vary to some degree upon the operating pressures involved. For example, at 0.5 mm. Hg pressure, p-xylylene has a ceiling temperature of about 25° C.–30° C., α,α,α′,α′-tetrafluoro-p-xylylene has a ceiling temperature of about 40° C., whereas n-butyl-p-xylylene has a condensation temperature of about 130° C.–140° C.

Thus, by this process, polymers are made by maintaining the condensation-polymerization zone at a temperature below the ceiling condensation temperature of the diradical species involved thereby causing the diradicals to polymerize instantaneously to form clear transparent films on the condenser walls which can easily be stripped therefrom. Conveniently, at the temperatures and pressures involved, the reaction by-products, i.e., sulfur dioxide and the saturated and/or unsaturated hydrocarbons formed by the coupling of the particular R groups in the bis-sulfone remain in the gaseous state as they pass through the condensation zone and can be subsequently collected in additional cold traps.

In this process, the reactive diradicals are prepared by pyrolyzing a p-xylene bis-sulfone at temperatures between about 600° C. and 1000° C. but below the cleavage temperature of the ring substituents present on the aromatic nucleus. As can be appreciated, care must be exercised at the higher temperature limits in order to prevent the ring substituents and especially the alkyl groups or other substituents having relatively weak bonding strengths from being cleaved off the aromatic nuclei. To this extent, temperatures between about 650° C. and 850° C. are preferred. At such temperatures, essentially quantitative yields of the reactive diradicals are secured. Operation at temperatures less than 600° C. serves only to increase the reaction time and lessen the yield of polymer secured. At temperatures above about 1000° C. or above the cleavage temperatures of the particular ring substituents employed, cleavage of the substituent groups can occur resulting in tri- or polyfunctional species causing cross-linking or highly branched polymers.

Pyrolysis temperature is essentially independent of the operating pressure. It is however preferred that reduced or subatmospheric pressures be employed. For most operations, pressures within the range of 0.001 to 10 mm. Hg are most practical. However, if desired greater pressures can be employed. The course of the pyrolysis can be ascertained by observation of the pressure changes accompanying the reaction. As the decomposition begins, the evolution of gaseous products causes an increase in pressure which returns to the initial pressure level when the reaction has reached completion.

The polymers prepared by the process of the present invention are readily recovered from the polymerization zone by a convenient means depending upon the particular zone employed. Where a cold surface such as a condenser is employed as the polymerization zone, the polymer can be removed from the wall of the zone by mechanical stripping or other means. Condensation of the diradicals in a water sprayer under the surface of an aqueous medium recovers the polymer in particulate form, which can then be separated by filtration and drying by conventional means prior to fabrication.

The polymers produced by the present invention, and more particularly the α,α,α′,α′-tetrafluoro-p-xylylene or perfluoro-p-xylylene species, have been found to exhibit excellent solvent resistance and thermal stability. These polymers are particularly desirable in films, surface coatings, electrical insulation and other similar applications, particularly where high resistance to thermal and chemical deterioration is necessary.

While the process of the present invention is primarily directed to the formation of para-xylylene polymers wherein the hydrogen atoms on the alpha carbons, i.e., the carbon atoms immediately adjacent to the aromatic ring, are replaced by the more stable fluorine substituents, the process is equally capable of providing the unsubstituted species, i.e., poly(para-xylylene) per se.

The following examples further illustrate the present invention and are not intended to limit the scope thereof in any manner. Unless otherwise specified, all percentages and parts are by weight.

EXAMPLE I

*Preparation of α,α′-dibromo-α,α,α′,α′-tetrafluoro-p-xylene*

α,α,α′,α′-Tetrafluoro-p-xylene was prepared by the method of Hasek et al., J. Am. Chem. Soc., 82, 543 (1960), by the reaction of terephthaldehyde with sulfur tetrafluoride at temperatures of about 150° C.

0.15 mole of α,α,α′,α′-tetrafluoro-p-xylene as prepared above was admixed with 0.33 moles of N-bromo-succinimide and 320 parts of carbon tetrachloride. The mixture was irradiated with an ultraviolet lamp while maintained at the reflux temperature of the solvent. The precipitated succinimide was removed by filtration and the filtrate was distilled to give 0.12 mole of the novel composition, α,α′,-dibromo-α,-α,α′,α′-tetrafluoro-p-xylene having the structural formula

and a boiling point of 102°–107° C. at 25 mm. Hg.

The compound was subjected to infrared analysis which showed the characteristic —CF₂— absorptions at 9.2 and 9.4 microns. The presence of the bromine substituents was confirmed by hydrolysis of the compound to terephthalic acid with silver acetate in aqueous acetic acid solution.

The compound was subjected to elemental analysis as follows.

Calculated for $C_8H_4F_4Br$: C, 28.60; H, 1.20; F, 22.62 Br, 47.58. Found: C, 28.85; H, 1.34; F, 22.87 Br, 47.85.

EXAMPLE II

*Preparation of α,α′-dichloro-α,α,α′,α′-tetrafluoro-p-xylene*

A solution of 10.7 grams of α,α,α′,α′-tetrafluoro-p-xylene in 100 milliliters of carbon tetrachloride was irradiated with an ultraviolet lamp. The solution was maintained at the reflux temperature of the solvent by the heat of the ultraviolet lamp. Chlorine was passed into the solution until the color of the chlorine remained in the solution, which amounted to about 9 grams of chlorine. Irradiation was continued for an additional 30 minutes. The excess chlorine was purged from solution by a stream of argon. Distillation of the reaction solution gave 11.6 grams of α,α′-dichloro-α,α,α′,α′-tetrafluoro-p-xylene having a boiling point of 86–90° C. at 34 millimeters Hg.

The compound was subject to infrared analysis which showed the characteristic —CF₂— absorption at 9.2 and 9.4 microns. The presence of the chlorine substituents was confirmed by hydrolysis of the compound to terephthalic acid with silver acetate in aqueous acetic acid solution.

EXAMPLE III

*Preparation of α,α′-dibromo-α,α,α′,α′-tetrafluoro-2-chloro-p-xylene*

2-chloroterephthalaldehyde was prepared by bromination of 2-chloro-p-xylene to 2-chloro-α,α,α′,α′-tetrabromo-p-xylene followed by hydrolysis in a manner analogous to the preparation of terephthalaldehyde as described in Org. Synthesis, col. vol. III, p. 788.

73 grams of the 2-chloro-terephthalaldehyde was admixed with 180 grams of sulfur tetrafluoride and trace amounts of water. The mixture was heated at 150° C. for 12 hours under autogeneous pressure. The produce, α,α,α',α'-tetrafluoro-2-chloro-p-xylene, was dissolved in methylene chloride and washed with water and 5% sodium carbonate. Distillation gave 67.5 grams of said product having a boiling point of 88–89° C. at 20 mm. Hg.

42.4 grams of α,α,α',α'-tetrafluoro-2-chloro-p-xylene as prepared above was admixed with 90 grams of N-bromosuccinimide in 500 ml. of carbon tetrachloride and the mixture was irradiated with a 100 watt ultraviolet lamp while at reflux for 64 hours. The resulting succinimide was then removed by filtration. After evaporation of the carbon tetrachloride, the residue was fractionally distilled. There was obtained 11.05 grams of α,α-dibromo-α,α,α',α'-tetrafluoro-2-chloro-p-xylene having a boiling point of 126–128° C. at 25 mm. Hg.

Vapor phase chromatographic analysis on a silica column showed that the product so obtained was 98.5% pure. The structure of the product was further proven by its conversion to the bis-sulfone (Example VII) which had the correct elemental analysis. Also, the spectral properties of the above product and the bis-sulfone were shown to be consistent with this assignment.

EXAMPLE IV

*Preparation of α,α'-bis(ethyl mercapto)α,α,α',α'-tetrafluoro-p-xylene*

To a solution of 0.11 mole of sodium in 40 ml. of methanol was added 0.1 mole of ethyl mercaptan and was then diluted with 100 ml. of dimethyl sulfoxide. After the addition of 0.045 mole of the α,α'-dibromo-α,α,α',α'-tetrafluoro-p-xylene produced in Example I, the reaction mixture was heated at 50° to 60° C. for about 2 hours. Thereafter, the reaction mixture was poured into water wherein the immiscible novel product α,α'-bis(ethyl mercapto)-α,α,α',α'-tetrafluoro-p-xylene having the structural formula

was separated.

The specific α,α'-bis(hydrocarbyl mercapto)-α,α,α',α'-tetrafluoro-p-xylene compositions summarized in Table I presented hereinbelow and having the general formula:

wherein R is a lower hydrocarbon group as defined above, were produced in the manner described above and are solely dependent upon the particular mercaptan employed in the reaction.

TABLE I.—α,α'-BIS(HYDROCARBYL MERCAPTO)α,α,α',α' TETRAFLUORO-p-XYLENE

| R-hydrocarbyl group | B.P. | Yield, percent |
|---|---|---|
| $C_2H_5$ | 90–110° (0.2 mm.) | 75 |
| n-$C_3H_7$ | 123–140° (0.5–1 mm.) | 76 |
| n-$C_4H_9$ | 130–140° (0.2 mm.) | 75 |
| —$C_6H_5$ | M.P. 152–160° | 40 |

EXAMPLE V

*Preparation of α,α'-bis(ethyl sulfonyl)α,α,α',α'-tetrafluoro-p-xylene*

To a solution of 0.08 mole of α,α'-bis(ethyl mercapto) α,α,α',α'-tetrafluoro-p-xylene as prepared in Example IV in 300 ml. of a 1:1 acetic acid/acetic anhydride mixture cooled to 0° to 5° C. was added 57 ml. of 30 percent hydrogen peroxide over a period of about two hours. The mixture was gradually allowed to warm to room temperature and was continuously stirred for 24 hours. The reaction mixture was poured into water wherein the immiscible product separated. The compound had a melting point of 158–164° C. The compound was subjected to an elemental analysis which showed—

Calculated for $C_{12}H_{14}F_4S_2O_4$: C, 39.77; H, 3.89; F, 20.97; S, 17.70; O, 17.67. Found: C, 39.73; H, 3.91; F, 20.74; S, 17.50; O, 18.12.

Table II summarizes the α,α'-bis(hydrocarbyl sulfonyl) α,α,α',α'-tetrafluoro-p-xylenes having the general formula

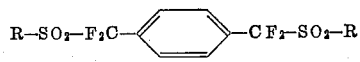

wherein R is a lower hydrocarbon group as described above, which was produced in the manner described above.

TABLE II.—α,α'-(HYDROCARBYL SULFONYL)α,α,α',α'-TETRAFLUORO-p-XYLENES

| R-hydrocarbyl group | M.P. (deg.) | Yield, percent |
|---|---|---|
| $C_2H_5$ | 158–164 | 83 |
| n-$C_3H_7$ | 158–163 | 65 |
| n-$C_4H_9$ | 162–166 | 63 |
| $C_6H_5$ | 232–240 | 59 |

EXAMPLE VI

*Preparation of α,α'-bis(ethyl mercapto)α,α,α',α'-tetrafluoro-2-chloro-p-xylene*

A solution of sodium methoxide was prepared from 2.05 grams of sodium and 40 milliliters of methanol and was thereafter diluted with 100 milliliters of dimethyl sulfoxide. 5.5 grams of ethyl mercaptan was added and the solution was stirred for 10 minutes. To the above stirred solution of the ethyl mercaptide was then added 13.9 grams of α,α'-dibromo-α,α,-α',α'-tetrafluoro-2-chloro-p-xylene as prepared in Example III. The reaction mixture was heated at 50°–60° C. for 2 hours and then cooled and stirred at room temperature for 16 hours. The mixture was poured into ice water and extracted with methylene chloride. Distillation of the extracted residue gave 11.4 grams of α,α'-bis(ethyl mercapto)α,α,α',α'-tetrafluoro-2-chloro-p-xylene representing a 91% yield. The produce had a boiling point of 105–120° C. at 0.2–0.5 mm. Hg.

EXAMPLE VII

*Preparation of α,α'-bis(ethyl sulfonyl)α,α,α',α'-tetrafluoro-2-chloro-p-xylene*

To a solution of 11.4 grams of α,α'-bis(ethyl mercapto) α,α,α',α'-tetrafluoro-2-chloro-p-xylene as produced in Example VI in 130 milliliters of 1:1 acetic acid-acetic anhydride solution was added dropwise 25 milliliters of 30 percent hydrogen peroxide at 0° to 5° C. Stirring was continued at this temperature for 3 hours, then the mixture was allowed to gradually warm up to room temperature. Upon pouring into ice water, the sulfone separated and was thereafter washed successively with water, 5% sodium carbonate and again with water. Recrystallization from chloroform/hexane solution gave 7.2 grams of α,α'-bis(ethylsulfonyl)α,α,α',α' - tetrafluoro-2-chloro-p-xylene having am elting point of 120–122° C. The infrared spectrum (KCL pellet) showed $SO_2$ absorption at 7.5 and 8.6μ and fluorine absorptions between 9 and 10 microns. The compound was subjected to an elemental analysis which showed—

Calculated for: $C_{12}H_{13}F_4S_2O_4$: C, 36.24; H, 3.30; F, 19.20; S, 16.16; Cl, 8.94. Found: C, 36.48; H, 3.25; F, 19.36; S, 16.28; Cl, 8.82.

EXAMPLE VIII 2,3,5,6-tetrafluoroterephthaldehyde is prepared by adding 23 grams of 1,4-dipropenyl-2,3,5,6-tetrafluorobenzene, prepared in the manner described by Birchall et al., J. Chem. Soc., 4977 (1962), to a solution of 12 grams of sulfanilic acid and 800 grams of sulfuric acid (specific gravity 1.84) in 1 liter of water. 44 grams of sodium dichromate in 200 ml. of water is then added to the vigorously stirred solution maintained at 30–40° C. The reaction product 2,3,5,6-tetrafluoroterephthaldehyde is extracted from the water solution with methylene chloride and washed free of acid.

In a manner analogous to that described in Examples III, VI and VII the dialdehyde prepared above is converted to the corresponding $\alpha,\alpha'$-bis(hydrocarbyl sulfonyl) $\alpha,\alpha,\alpha',\alpha'$-2,3,5,6-octafluoro-p-xylene having the general formula

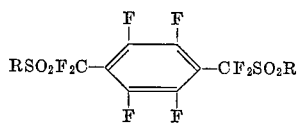

EXAMPLE IX 2-phenyl-p-xylene prepared as described by J. Colonge et al., Compt. Rend. 251, 2723 (1960), is converted to 2-phenyl-terephthalaldehyde by irradiating 121.94 grams of 2-phenyl-p-xylene with an ultraviolet lamp while heating said p-xylene to 110°–130° C. 464 grams of bromine are added to form $\alpha,\alpha,\alpha',\alpha'$-tetrabromo-2-phenyl-p-xylene which is taken up in 500 ml. of methyl chloride, washed with 5% thiosulfate solution to remove excess bromine and subsequently washed with water. The crude tetrabrominated compound is dried and the methylene chloride is evaporated.

The crude tetrabrominated p-xylene is then added to 650 ml. of concentrated sulfuric acid and the mixture is stirred and heated to 110° C. The reaction mixture is maintained at 110° C. for three hours under aspirator pressure. Thereafter, the mixture is poured into an ice bath. The product is collected by filtration and washed successively with water and 5% sodium carbonate solution. Thereafter, the product, 2-phenyl-terephthalaldehyde is recrystallized from chloroform and hexane.

In a manner analogous to that described in Examples III, VI and VII, the 2-phenyl terephthaladehyde is converted to the corresponding $\alpha,\alpha'$-bis(hydrocarbyl sulfonyl) $\alpha,\alpha,\alpha',\alpha'$-tetrafluoro-2-phenyl-p-xylene having the general formula:

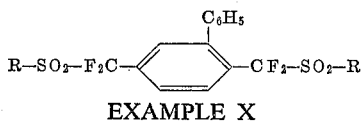

EXAMPLE X

*Preparation of poly(perfluoro-p-xylylene)*

The $\alpha,\alpha'$-bis(hydrocarbyl sulfonyl)$\alpha,\alpha,\alpha',\alpha'$-tetrafluoro-p-xylenes or bis-sulfones as prepared in Example V were vaporized and the vapors so formed were led into a pyrolysis chamber which consisted of a quartz tube heated by means of a heavy duty furnace. Pyrolysis of bis-sulfones under reduced pressure commenced at temperatures above about 400° C. Heating under these conditions decomposes the bis-sulfone with the evolution of sulfur dioxide and other gaseous materials resulting in an increase in pressure which returns to the initial pressure when the reaction has reached completion. The pyrolysate, upon condensation, polymerizes instantaneously to form a clear transparent film which is deposited on the walls of the cooled receivers. The polymer, poly(perfluoro-p-xylylene) is a highly crystalline material possessing a crystalline melting point in excess of 360° C. Its thermal stability is excellent. Heat the polymer at 30° C. in air for 100 hours resulted in no degradation.

Table III summarizes the preparation of poly(perfluoro-p-xylylene) from the bis-sulfones prepared in Example VI.

TABLE III.—PREPARATION OF POLY($\alpha,\alpha,\alpha',\alpha'$-TETRAFLUORO-p-XYLYLENE)

| R—SO$_2$—F$_2$C—⟨⟩—CF$_2$—SO$_2$—R | Vaporization Temperature, °C. | Pyrolysis Temperature, °C. | Pressure (mm. Hg) during— | | |
|---|---|---|---|---|---|
| | | | Initial | Rea'cn | Final |
| R=C$_2$H$_5$ | 250 | 700 | 0.1 | 0.3 | 0.1 |
| R=C$_2$H$_5$ | 200 | 650 | 0.05 | 0.3 | 0.03 |
| R=C$_3$H$_7$ | 200 | 700 | 0.1 | 1.2 | 0.1 |
| R=C$_4$H$_9$ | 200 | 700 | 0.1 | 0.8 | 0.1 |
| R=C$_6$H$_5$ | 300 | 700 | 0.05 | 0.4 | 0.05 |
| R=C$_6$H$_5$ | 240 | 800 | 0.02 | 0.5 | 0.02 |

Table IV is illustrative of the excellent properties exhibited by poly(perfluoro-p-xylylene).

TABLE IV.—PROPERTIES OF POLY($\alpha,\alpha,\alpha',\alpha'$-TETRAFLUORO-p-XYLYLENE)

[A. Mechanical Properties]

| Measured | Tensile Modulus (p.s.i.) | Tensile Strength (p.s.i.) | Elongation (Percent) |
|---|---|---|---|
| At 25° C | 250,000 | 3,800 | 2 |
| At 275° C | 23,000 | 250 | 70 |
| At 300° C | 16,000 | 370 | 88 |
| At 25° C. after 100 hours at 300° C | 220,000 | 3,500 | 2 |

[B. Electrical Properties]

| Measured | Dielectric Constant | Dissipation Factor |
|---|---|---|
| 60 c.p.s | 2.6–2.7 | 0.0017 |
| 100 c.p.s | 2.55–2.65 | 0.0020 |
| 10$_6$ c.p.s | 2.50–2.60 | 0.0037 |

EXAMPLE XI

*Preparation of poly-$\alpha,\alpha,\alpha',\alpha'$-tetrafluoro-2-chloro-p-xylylene*

The 2-chloro-$\alpha,\alpha'$-bis(ethylsulfonyl)$\alpha,\alpha,\alpha',\alpha'$-tetrafluoro-p-xylene prepared in Example VII was vaporized at 190° C. and a pressure of 0.04 mm. Hg and fed into the pyrolysis chamber described in Example X. The pyrolysate was cooled successively with a water cooled condenser at 15–20° C. and a Dry Ice-acetone bath. A polymeric film of poly(2-chloro)-$\alpha,\alpha,\alpha',\alpha'$-tetrafluoro-p-xylene was deposited on the surface of the cooled receivers.

EXAMPLE XII

*Preparation of poly($\alpha,\alpha,\alpha',\alpha'$-2,3,5,6-octafluoro-p-xylylene)*

In the same manner described in Example XI, a polymeric film of poly($\alpha,\alpha,\alpha',\alpha'$-2,3,5,6-octafluoro-p-xylylene) is deposited on a cooled substrate surface upon the vaporization and pyrolysis of the corresponding bis-sulfone described in Example VIII.

EXAMPLE XIII

*Preparation of poly($\alpha,\alpha,\alpha',\alpha'$-2-phenyl-p-xylylene)*

In the same manner as described in Example XI, a polymeric film of poly($\alpha,\alpha,\alpha',\alpha'$-2-phenyl-p-xylylene) is deposited on a cooled substrate surface upon the vaporization and pyrolysis of the corresponding bis-sulfone described in Example IX.

EXAMPLE XIV

α,α'-Bis(ethyl sulfonyl)-p-xylene having the structural formula

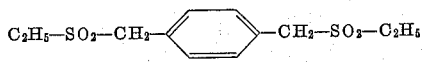

was pyrolyzed as described in Example X to yield upon condensation poly-p-xylylene. The infrared spectrum was identical with that obtained from a known linear poly-p-xylylene.

This example illustrates the wide applicability of bissulfone pyrolysis to produce polymers of the para-xylylene family. The polymers produced by the present invention have been found to exhibit excellent solvent resistance and thermal stability. These polymers are particularly desirable in films, surface coatings, electrical insulation and other similar applications, particularly where high resistance to thermal and chemical deterioration is necessary.

For example, copper wires upon which poly(α-perfluoro-p-xylylene) has been vapor deposited provide excellent electrical conductors having an integral insulating coating thereon which is highly resistant to environmental deteriorations. Moreover, when fibrous materials such as paper or cloth are impregnated with the vapor deposited polymer, the wet strength of the material is increased; also, the impregnated materials can now be employed in atmospheres wherein thermal and chemical deterioration would have made their prior use almost impossible.

What is claimed is:

1. Method for producing linear thermoplastic polymers having the basic repeating unit

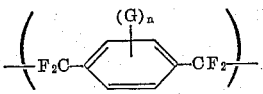

wherein G is an aromatic nuclear substituent selected from the group consisting of aryl, carbalkoxy, lower alkyl and halogen and n is a number from 0 to 4, inclusive, which includes the steps of forming a p-xylylene diradical having the basic structure

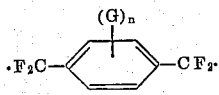

wherein G and n are as above, by the pyrolysis at temperatures between about 600° C. and 1,000° C. of an α,α'-bis(hydrocarbylsulfonyl)α,α,α',α' - tetrafluoro - p-xylene having the general formula

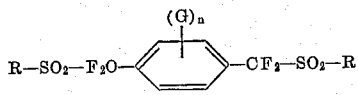

wherein G and n are as above and R is a lower hydrocarbon group, and cooling and condensing the thus formed diradicals to a temperature below about 40° C. to polymerize the diradicals instantaneously.

2. The method defined in claim 1 wherein the pyrolysis is conducted at a temperature between 650° C. and 850° C.

3. The method defined in claim 1 wherein the pyrolysis is conducted at a presure of between about 0.0001 and 10.0 mm. Hg pressure.

4. Linear thermoplastic polymer having the repeating unit

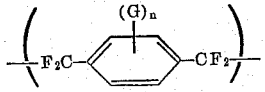

wherein G is an aromatic nuclear substituent selected from the group consisting of aryl, carbalkoxy, lower alkyl and halogen and n is a number from 0 to 4, inclusive.

5. Poly(α-perfluoro-p-xylylene) characterized by the repeating unit:

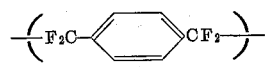

6. Poly(2-chloro-α-perfluoro-p-xylylene) characterized by the repeating unit:

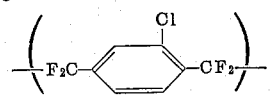

7. Composition having the general structure

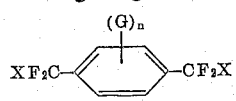

where G is an aromatic nuclear substituent selected from the group consisting of aryl, carbalkoxy, lower alkyl and halogen, n is a number from 0 to 4, inclusive, and X is a halogen having a lower bond strength than fluorine.

8. α,α' - Dibromo - α,α,α',α' - tetrafluoro-p-xylene.
9. α,α' - Dichloro - α,α,α',α' - tetrafluoro-p-xylene.
10. 2 - chloro - α,α' - dibromo - α,α,α',α' - tetrafluoro-p-xylene.
11. α,α' - Bis(hydrocarbyl mecapto)α,α,α',α' - tetrafluoro-p-xylene having the general structure

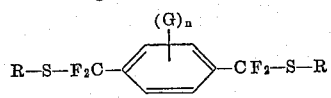

wherein G is an aromatic nuclear substituent selected from the group consisting of aryl, carbalkoxy, lower alkyl and halogen, n is a number from 0 to 4, inclusive, and R is a lower hydrocarbon group.

12. α,α' - Bis(ethyl mercapto)α,α,α',α' - tetrafluoro-p-xylene.
13. 2 - chloro - α,α' - bis(ethyl mercapto)α,α,α',α'-tetrafluoro-p-xylene.
14. α,α' - Bis(propyl mercapto)α,α,α',α' - tetrafluoro-p-xylene.
15. α,α' - Bis(butyl mercapto)α,α,α',α' - tetrafluoro-p-xylene.
16. α,α' - Bis(phenyl mercapto)α,α,α',α' - tetrafluoro-p-xylene.
17. α,α' - Bis(hydrocarbyl sulfonyl)α,α,α',α' - tetrafluoro-p-xylene having the general structure

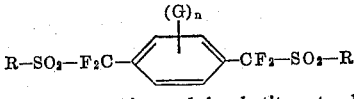

wherein G is an aromatic nuclei substituent selected from the group consisting of aryl, carbalkoxy, lower alkyl and halogen, n is a number from 0 to 4, inclusive and R is a lower hydrocarbon group.

18. α,α' - Bis(ethyl sulfonyl)α,α,α',α' - tetrafluoro-p-xylene.
19. 2 - chloro - α,α' - bis(ethyl sulfonyl)α,α,α',α' - tetrafluoro-p-xylene.
20. α,α' - Bis(propyl sulfonly)α,α,α',α' - tetrafluoro-p-xylene.
21. α,α' - Bis(butyl sulfonyl)α,α,α',α' - tetrafluoro-p-xylene.
22. α,α' - Bis(phenyl sulfonyl)α,α,α',α' - tetrafluoro-p-xylene.

References Cited

Fuqua, S. A. et al.: Synthesis and Chemistry of Several Fluorinated p-Xylenes Designed as Precursors for α,α,α',α'-Tetrafluoro-p-Xylylene. In Tetrahedron, vol. 20 pp. 1625–32 1964; Q.D. 241 T4.

JOSEPH L. SCHOFER, *Primary Examiner.*

J. A. DONAHUE, *Assistant Examiner.*